Dec. 13, 1938.     J. G. FORD ET AL     2,139,946

DIELECTRIC LIQUID FOR ELECTRICAL APPARATUS

Filed Dec. 5, 1935     2 Sheets—Sheet 1

WITNESSES:

INVENTORS
James G. Ford &
Charles F. Mill
BY
ATTORNEY

Dec. 13, 1938.   J. G. FORD ET AL   2,139,946
DIELECTRIC LIQUID FOR ELECTRICAL APPARATUS
Filed Dec. 5, 1935   2 Sheets-Sheet 2

INVENTORS
James G. Ford &
Charles F. Hill

Patented Dec. 13, 1938

2,139,946

UNITED STATES PATENT OFFICE 2,139,946

DIELECTRIC LIQUID FOR ELECTRICAL APPARATUS

James G. Ford, Forest Hills, and Charles F. Hill, Edgewood, Pa., assignors to Westinghouse Electric & Manufacturing Company, East Pittsburgh, Pa., a corporation of Pennsylvania Application December 5, 1935, Serial No. 53,706

15 Claims. (Cl. 252—1)

The invention relates to dielectric liquids for electrical apparatus.

An object of the invention is to provide a dielectric liquid for electrical apparatus which is stable under all conditions, non-inflammable and when electrically decomposed gives off a substantially incombustible gas.

It is also an object of the invention to provide a dielectric liquid for electrical apparatus having a low viscosity and which remains a liquid over a wide temperature range enabling its efficient use under the ordinary conditions to which electrical apparatus is subjected.

Figure 1:
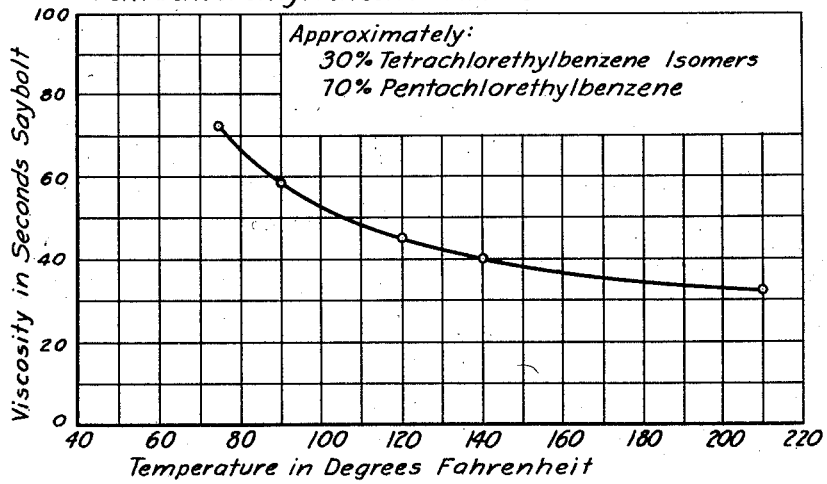
Figure 2:
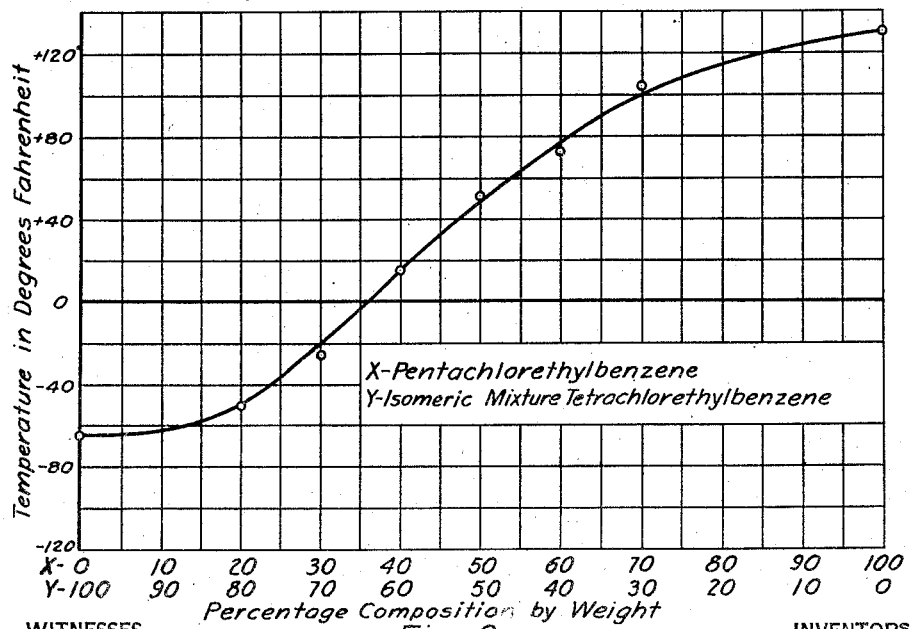
Figure 3:
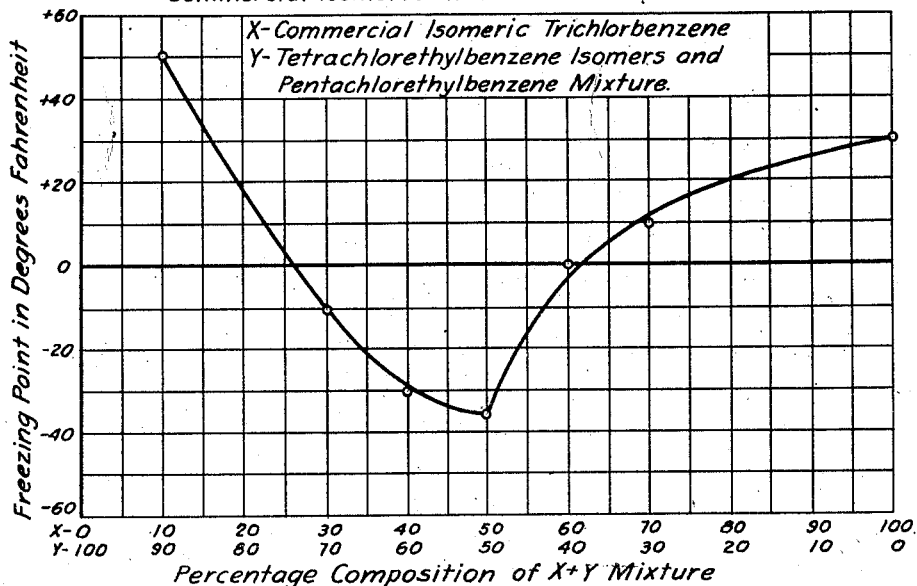
Figure 4:
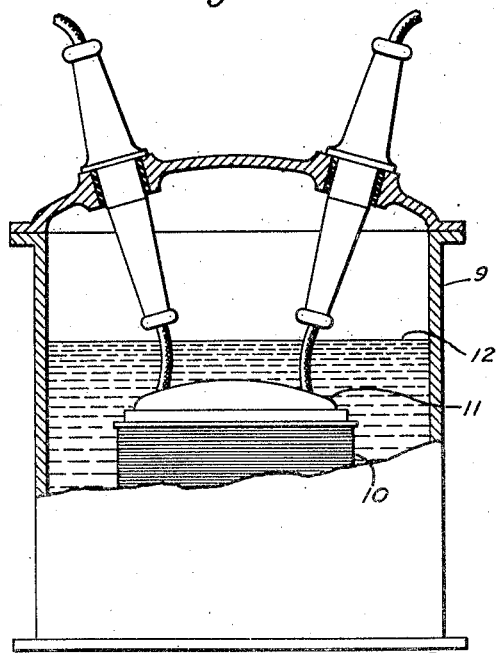

For a fuller understanding of the nature and objects of the invention, reference may be had to the following detailed description taken in conjunction with the accompanying drawings, in which Figure 1 is a graph plotted from tests made on the viscosity of a mixture of 30% by weight ethyl-tetrachlorbenzene isomers and 70% by weight ethyl-pentachlorbenzene at different temperatures, Fig. 2 is a graph showing the freezing characteristics of different mixtures of ethyl-pentachlorbenzene and ethyl-tetrachlorbenzene isomers, Fig. 3 is a graph showing the effect of the addition of a freezing point depressor to a mixture of 30% by weight ethyl-pentachlorbenzene and 70% by weight ethyl-tetrachlorbenzene isomers, Fig. 4 is a view partly in side elevation and partly in section showing the manner in which the coils and core of a transformer are immersed in a dielectric liquid of the kind disclosed.

In providing dielectric liquids for transformers, reactors, regulators, circuit breakers and other electrical apparatus which are utilized in electrical systems and exposed to temperature changes which vary through a wide range, one of the requirements for a suitable dielectric liquid is that it shall have a low freezing point and a fairly high boiling point. When the dielectric liquid is to be employed in transformers located in buildings, tunnels or in close proximity to other structures, it is desirable that it be non-inflammable and that the gases evolved on decomposition by an electric arc be incombustible.

Since the dielectric is employed for cooling purposes, it should have a low viscosity to facilitate circulation to effect a proper heat transfer. In most transformers, it is necessary to pump the dielectric liquid through cooling coils and the viscosity greatly affects the efficiency of the pumping operation and therefore the heat transfer.

In the interest of commercial economy, the dielectric liquid must have a low evaporation rate and high chemical stability so that it will not deteriorate either during use or when stored.

If the dielectric liquid is to be employed in capacitors and other similar apparatus, a low power factor, high dielectric strength and a high dielectric constant are desirable characteristics. When the dielectric liquid has these characteristics, the efficiency of the capacitors is high.

The dielectric liquid to be disclosed hereinafter possesses all the requirements recited and may also be produced in desired quantities at a cost which will permit extensive commercial use.

The main constituents or base of our dielectric liquid are ethyl-tetrachlorbenzene isomers and ethyl-pentachlorbenzene. These compounds may be produced by any of the commercial processes known to the art.

The ethyl-tetrachlorbenzene utilized in preparing the base of the dielectric liquid may comprise one or more of its isomers.

One method of producing ethyl-tetrachlorbenzene and ethyl-pentachlorbenzene is known as the Friedel-Crafts synthesis. It comprises treating ethylchloride with benzene in the presence of an aluminum chloride catalyzer. The ethylbenzene is then chlorinated by some suitable chlorination process which will not be described.

Most chlorination processes involve the bubbling of chlorine through the ethylbenzene. If the chlorination processes are carried on until all the ethylbenzene is chlorinated, the resultant compound will be ethyl-pentachlorbenzene. It has been found that after the chlorination of the ethylbenzene has proceeded until the treated liquid comprises about 20% to 40% by weight ethyl-tetrachlorbenzene and 80% to 60% by weight ethyl-pentachlorbenzene, the chlorination proceeds so slowly that the cost of further chlorination rises quickly. Therefore, in preparing our base compounds, the chlorination of ethylbenzene is stopped when the ethyl-tetrachlorbenzene and ethyl-pentachlorbenzene reach a ratio ranging from about 20:80 or 30:70. The proper point at which to stop the chlorination process may be determined by making density tests which are well known in the art and for that reason will not be described.

In producing the base compound for our dielectric liquid, the ratio of ethyl-tetrachlorbenzene and ethyl-pentachlorbenzene may be varied greatly, since both of these compounds possess the physical and electrical characteristics which have been recited as desirable. Generally, the ratio of ethyl-tetrachlorbenzene and ethyl-pentachlorbenzene will depend to some extent on the conditions that are to be imposed on the dielectric liquid.

It has been found that ethyl-pentachlorbenzene has slightly better electrical characteristics than ethyl-tetrachlorbenzene and, therefore, from this point of view, a liquid which is predominantly ethyl-pentachlorbenzene is desirable. A base compound comprising 22% by weight ethyl-tetrachlorbenzene isomers and 78% by weight ethyl-pentachlorbenzene has a low freezing point. A consideration of the electrical and physical characteristics and economics of production reveal that a preferred base compound comprises about 20% to 30% by weight ethyl-tetrachlorbenzene and 80% to 70% by weight ethyl-pentachlorbenzene.

It has been found that a base compound including from 10% to 20% by weight of ethyl-tetrachlorbenzene isomers and 90% to 80% by weight of ethyl-pentachlorbenzene has a freezing point of from 95° F. to 70° F. The electrical characteristics of this base compound are substantially that of ethyl-pentachlorbenzene which has a low power factor, high ohmic resistance and a high dielectric constant.

While the base compound has value as a dielectric liquid by itself, we find for most practical applications that it is desirable to depress the freezing point. In order to depress the freezing point of the base compound, we have employed with good results one or more of isopropyl-trichlorbenzene, aryltrichlortetralin, trichlortoluene and trichlorbenzene isomers. The amount of isopropyl-trichlorbenzene, trichlortoluene or aryltrichlortetralin, either alone or mixed, may be varied from 10% to 25% by weight.

Isopropyl-trichlorbenzene, trichlortoluene isomers and aryltrichlortetralin have good electrical and physical characteristics and when added to the base compound produce a dielectric liquid having substantially the characteristics of the base compound. Trichlorbenzene is not entirely satisfactory as a freezing point depressor but under some conditions may be used to advantage. The objection to trichlorbenzene isomers is that it has a high power factor, evaporates quickly, and is adversely affected by exposure to light.

It has been found that a dielectric liquid containing ethyl-tetrachlorbenzene and ethyl-pentachlorbenzene in the ratio of 20:80 and from 10% to 25% by weight of one or more of isopropyl-trichlorbenzene and aryltrichlortetralin and trichlorbenzene isomers will have a temperature range from —25° F. to about 550° F. This range of temperature is sufficient to meet all operating conditions to which electrical apparatus are ordinarily subjected.

The following table gives the results of the tests made to ascertain the power factor of the dielectric liquid produced in accordance with this invention:

PROPERTIES OF THE DIELECTRIC LIQUID

*Tests were made with 60-cycle current*

|  | Power factor at— | |
|---|---|---|
|  | 25° C. | 80° C. |
|  | Percent | Percent |
| 80% ethyl-pentachlorbenzene 20% ethyl-tetrachlorbenzene isomers | Less than 1 | 2, 3 |
| Isopropyl-trichlorbenzene | 1, 2 | 16 |
| Aryltrichlortetralin | 1, 2 | About 6 to 40 |
| Trichlorbenzene | 10 to 40 | 60 to 80 |
| Ethyl-tetrachlorbenzene |  |  |
| Ethyl-pentachlorbenzene |  |  |
| Isopropyl-trichlorbenzene |  |  |

The value of the dielectric liquid will be appreciated by reference to the following specific examples and their characteristics:

|  | Percent by weight |
|---|---|
| Ethyl-tetrachlorbenzene isomers | 54 |
| Ethyl-pentachlorbenzene | 36 |
| Trichlortoluene isomers | 10 |

This dielectric liquid has a freezing point of —15° F., boils at 520° F. but has no flash or fire point. The power factor for 60-cycle current at room temperature is about 1%.

|  | Percent by weight |
|---|---|
| Ethyl-tetrachlorbene isomers | 45 |
| Ethyl-pentachlorbenzene | 45 |
| Trichlorbenzene | 10 |

The freezing point of this dielectric is about +15° F., a flash point of 250° F., it boils at 510° F. but has no fire point. The power factor for 60-cycle current at room temperature is about 1%.

|  | Percent by weight |
|---|---|
| Ethyl-tetrachlorbenzene isomers | 40 |
| Ethyl-pentachlorbenzene | 40 |
| Trichlorbenzene | 20 |

This dielectric liquid does not freeze until the temperature is lowered to about —20° F. It has a flash point of 255° F., boils at 500° F. but has no fire point. The power factor for 60-cycle current at room temperature is about 1.2%.

|  | Percent by weight |
|---|---|
| Ethyl-tetrachlorbenzene isomers | 63 |
| Ethyl-pentachlorbenzene | 27 |
| Isopropyl-trichlorbenzene isomers | 10 |

The isopropyl-trichlorbenzene isomers lowers the freezing point to such an extent that this dielectric does not freeze until the temperature reaches about —55° F. The flash point is high being about 300° F. and the liquid does not boil until the temperature reaches about 540° F. It has no fire point. The power factor for 60-cycle current at room temperature is about .5%.

|  | Percent by weight |
|---|---|
| Ethyl-tetrachlorbenzene isomers | 82 |
| Trichlorbenzene | 18 |

The freezing point of this liquid is about —65° F., flash point 250° F., boiling point 490° F. and it has no fire point. The power factor for 60-cycle current at room temperature is 1.3%.

Referring to Fig. 4, a transformer casing 9 is illustrated with a core 10 carrying coils 11 disposed therein in accordance with standard practice. As illustrated, the casing contains a sufficient amount of our dielectric liquid 12 to completely immerse the coils 11.

In transformers, the dielectric liquid is utilized primarily for effecting a transfer of heat in order to keep the transformer coils and core at the proper temperature. In the cooling process, the dielectric liquid may be circulated in any well known manner commonly employed in the art.

In this specification, the term "aryltrichlortetralin" is employed to designate that three chlorine atoms are bonded to the carbon atoms in the ring structure. This gives two isomers of trichlortetralin.

Since certain changes may be made in the above mixtures, and different embodiments of the invention could be made without departing from the scope thereof, it is intended that all matter contained in the above description or taken in conjunction with the accompanying drawings shall be interpreted as illustrative and not in a limiting sense.

We claim as our invention:

1. A dielectric liquid for electrical apparatus consisting of ethyl-tetrachlorbenzene, ethyl-pentachlorbenzene and isopropyl-trichlorbenzene for depressing the freezing point of the dielectric liquid.

2. A dielectric liquid for electrical apparatus consisting of, in combination, from 75% to 90% by weight ethyl-tetrachlorbenzene and ethyl-pentachlorbenzene and from 25% to 10% by weight isopropyl-trichlorbenzene for lowering the freezing point.

3. A dielectric liquid for electrical apparatus consisting of, in combination, 15% to 18% by weight ethyl-tetrachlorbenzene, 60% to 72% by weight ethyl-pentachlorbenzene and 25% to 10% by weight isopropyl-trichlorbenzene.

4. A dielectric liquid for electrical apparatus consisting of, in combination, from 80% to 90% by weight ethyl-tetrachlorbenzene and ethyl-pentachlorbenzene and from 20% to 10% by weight aryltrichlortetralin for depressing the freezing point of the dielectric liquid.

5. A dielectric liquid for electrical apparatus consisting of from 60% to 90% by weight ethyl-tetrachlorbenzene and ethyl-pentachlorbenzene and from 40% to 10% by weight trichlorbenzene for depressing the freezing point of the dielectric liquid.

6. The method of protecting electrical apparatus provided with an electrical conductor and a casing which consists of interposing a dielectric between the casing and electrical conductor, the dielectric comprising from 90% to 75% by weight of a mixture of ethyl-tetrachlorbenzene and ethyl-pentachlorbenzene, the mixture comprising from 20% to 80% by weight ethyl-tetrachlorbenzene and from 80% to 20% ethyl-pentachlorbenzene, and 10% to 25%, by weight, of a freezing point depressor selected from the group consisting of isopropyl-trichlorbenzene, aryltrichlortetralin, trichlortoluene and trichlorbenzene.

7. The method of protecting electrical apparatus provided with an electrical conductor and a casing which consists of interposing a dielectric between the casing and electrical conductor, the dielectric comprising ethyl-tetrachlorbenzene, ethyl-pentachlorbenzene and 10% to 25% by weight trichlorbenzene as a freezing point depressor, which dielectric mixture upon decomposition by an electric arc generates substantially incombustible gases.

8. A dielectric material for electrical apparatus comprising ethyl-tetrachlorbenzene, ethyl-pentachlorbenzene, and a dielectric miscible organic freezing point depressor.

9. A dielectric material for electrical apparatus comprising ethyl-tetrachlorbenzene, ethyl-pentachlorbenzene, and a freezing point depressor consisting of trichlorbenzene.

10. A dielectric material for electrical apparatus comprising ethyl-tetrachlorbenzene, ethyl-pentachlorbenzene, and a freezing point depressor consisting of isopropyl-trichlorbenzene.

11. A dielectric liquid for electrical apparatus consisting of ethyl-tetrachlorbenzene, ethyl-pentachlorbenzene and 10% to 25%, by weight, of a dielectric miscible organic freezing point depressor for lowering the freezing point of the dielectric liquid.

12. A dielectric liquid for electrical apparatus consisting of ethyl-tetrachlorbenzene, ethyl-pentachlorbenzene, and a freezing point depressor selected from the group consisting of isopropyl-trichlorbenzene, aryltrichlortetralin, trichlortoluene and trichlorbenzene for depressing the freezing point of the dielectric liquid.

13. A dielectric liquid for electrical apparatus consisting of, in combination, 15% to 18%, by weight, ethyl-tetrachlorbenzene, 60% to 72%, by weight, ethyl-pentachlorbenzene, and 25% to 10%, by weight, of a freezing point depressor selected from the group consisting of isopropyl-trichlorbenzene, aryltrichlortetralin, trichlortoluene, and trichlorbenzene for lowering the freezing point of the dielectric liquid.

14. The method of protecting electrical apparatus provided with an electrical conductor and a casing which consists of interposing a dielectric between the casing and electrical conductor, the dielectric comprising ethyl-tetrachlorbenzene, ethyl-pentachlorbenzene, and a freezing point depressor selected from the group consisting of isopropyl-trichlorbenzene, aryltrichlortetralin, trichlortoluene and trichlorbenzene for lowering the freezing point, which dielectric, upon decomposition by an electric arc, generates substantially incombustible gases.

15. The method of protecting electrical apparatus provided with a casing, an electrical conductor disposed in the casing which consists of interposing between the electrical conductor and casing a dielectric comprising from 75% to 90%, by weight, ethyl-tetrachlorbenzene and ethyl-pentachlorbenzene, and from 25% to 10%, by weight, of a freezing point depressor selected from the group consisting of isopropyl-trichlorbenzene, aryltrichlortetralin, trichlortoluene and trichlorbenzene.

JAMES G. FORD.
CHARLES F. HILL.